United States Patent [19]

O'Hare

[11] 4,454,684
[45] Jun. 19, 1984

[54] ROOT AUGMENTOR FOR VERTICAL HORTICULTURE

[76] Inventor: Louis R. O'Hare, 1700 Banyan #3, Fort Collins, Colo. 80526

[21] Appl. No.: 454,704

[22] Filed: Mar. 16, 1983

[51] Int. Cl.³ .......................................... A01G 25/00
[52] U.S. Cl. ........................................ 47/82; 47/59; 47/48.5
[58] Field of Search .................. 47/82, 83, 59, 60, 61, 47/62, 48.5, 45, 44, 5, 5.5

[56] References Cited

U.S. PATENT DOCUMENTS

| | | | |
|---|---|---|---|
| 3,052,062 | 9/1962 | Boyle | 47/5.5 |
| 3,110,128 | 11/1963 | Collins | 47/5.5 |
| 4,399,634 | 9/1983 | O'Hare | 47/59 |

Primary Examiner—James R. Feyrer
Assistant Examiner—Bradley M. Lewis

[57] ABSTRACT

The art of vertical horticulture is improved when plants growing outward from the sides of tall vertical columns are provided with a system that enhances root growth by causing some of the early formed branches to be converted to roots and then by having these newly formed roots grow in a nutrient aerosol environment which applies both liquid chemical nourishment as well as ample aeration to these roots, the required conversion of some branches into the plant's principal root system being accomplished by a vertical shield positioned around early formed branches both to prevent light from reaching the branches after a period of initial branch growth as well as to contain the moisture of the nutrient spray. Outer segments of the branches extend through perforations in the shield and thereby grow into the plant's system of branches and leaves.

7 Claims, 5 Drawing Figures

ROOT AUGMENTOR FOR VERTICAL HORTICULTURE

THE SPECIFICATION

This invention relates to the art of hydroponics and to ways of growing plants with liquid nutrient solutions. It also relates to the horticultural art of layering wherein branches of a plant are converted into root systems. However, the use of layering in this invention differs somewhat from the conventional practice of layering as it is practiced to provide a means of reproducing plants. In this invention layering is used differently and not as a means of reproducing a new plant from a parent plant, rather it is used as a means of providing additional nourishment to the same plant itself. Herein branches which are converted to roots are not converted to roots to supply nourishment for a new plant but rather according to the present concept the new root system which was converted from a former branch system remains on the original plant and functions as an augmented root system for the same plant. This augmented root system has a number of unique applications in that it is able to provide some roots which are extended into an air environment and are free of soil. This makes them ideal receptacles for nutrient aerosol to continue and increase the plant's growth. Secondly, since roots developing from branches have the support of the initial root system and are held in place by it, there is no need to transplant seedlings and to find a new root support in hydroponic media as is required in conventional hydroponic practice. The advantage of being able to provide both a supported root system without transplantation as well as an augmented root system for hydroponic nutrient is described in my copending application entitled, "Simplified Root Augmentation System for Hydroponics" of Ser. No. 315,718 and of filing date 10/27/81. This present invention relates that art to the art of vertical horticulture in which plants are grown one above the other in the same container. It does this by describing a way of improving vertical horitculture by applying to it the concept of root augmentation. Also the art of hydroponics is extended to vertical growing systems in such a way as to remove any requirement of having to transplant the young plant from a seed bed into a hydroponic root support container. In accord with this present invention the requirement to construct a vertical array of special root supports separate from the bed in which the seed initially takes root is obviated. The need to transplant the developed roots of partially grown plants into vertical hydroponic supports is likewise obviated by this invention. Also this invention provides a much more massive and powerful root system that would be available to the plant naturally because a large quantity of branches may be converted to roots. The biological efficiency of the roots is increased by the suspension in air of the new root system which provides abundant aeration. These advantages are realized in accord with the invention because the seeds of the plants to be grown hydroponically begin their root formation within a vertical cylinder and the branch system grows outward through holes in the cylinder wall. This innermost cylinder containing the initial root system forms the support for the branches growing out of the cylinder. Subsequently a length of the branches is converted to roots by shielding from light and by the application of liquid nutrient, but the support for those roots converted from early branches is already established by the initial root system within the innermost cylinder. As branches grow through an outer, shielding cylinder additional support for the plant is provided by the holes in the outer cylinder through which the branches grow. A supported root system is thereby developed from branches in the interstices between two concentric cylinders. In this way many plants may be grown one above the other through holes that are positioned on each cylinder with one hole above the other forming an array of many holes extending vertically upward.

The object of the invention then is to provide a hydroponic system for growing many plants in a small area of floor space by growing multiple plants in single containers in such a way that the plants in each container grow one above the other. Another object is to provide a hydroponic system for growing plants as rapidly as possible by increasing the root mass of each plant. Another object is to provide a hydroponic system for growing plants as simply as possible and without transplantation by shielding some early developed branches from light and nourishing them with hydroponic solution to convert them to a root system for the further development of the same individual plants.

These and other objectives and advantages will be clarified by referring now to the drawings.

FIG. 1 of the drawings shows a cylinder with holes in the cylinder wall through which seeds are planted into fibrous support material within the cylinder.

FIG. 2 shows small branches growing from holes in a cylinder wall.

FIG. 3 of the drawings shows two concentric cylinders with roots growing within the inner cylinder and branches extending between holes in the inner cylinder and holes in the outer cylinder.

Figure 1:
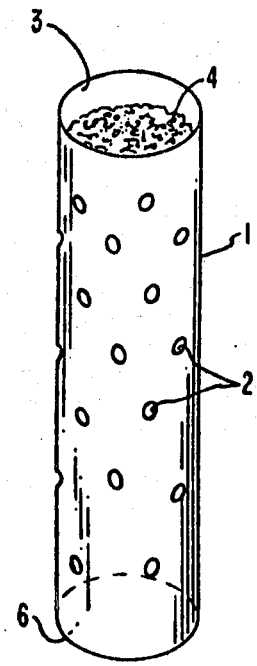

Referring then to FIG. 1 of the drawings, the cylinder 1 has holes 2 in its cylinder wall through which plant seeds not shown can be inserted into nutrient composition 4 which extends through the length of the interior cavity within 1. The nutrient composition 4 is comprised of various granular and fibrous materials in different embodiments and the purpose of 4 is to support seeds in a fixed place inside of holes 2 as well as to provide a moist medium through which water and nourishment is delivered to the seeds and sprouts which begin to grow from the seeds. In one embodiment for example composition 4 is potting soil which receives periodic watering through opening 5 at the top of 1. In another embodiment composition 4 is sand which receives nutrient hydroponic solution through 5. In similar embodiments very porous plastic meshes such as styrofoam or polyurethane foam are employed as composition 4 to hold seeds and young roots while they grow by receiving liquid nourishment through 5. The cylinder 1 may be of any solid structural material of sufficient strength to support a number of plants which grow from the seeds. In a preferred embodiment cylinder 1 is a porous ceramic cylinder of sufficiently small pore size as to prevent significant leakage of water or of support composition 4. However, the pore size is large enough to allow oxygen in the air to permeate 1 and to aerate the seeds and roots within 1. The water and liquid nourishment application means are not shown in this FIG. 1, but it is understood that any means such as pouring from a container or pumping through a pipe or hose are suitable liquid delivery means in different embodiments. Both water and liquid nourishment can be collected from surplus liquid drainage at the base of 1 through lower cylinder opening 6 which empties into a drainage receptacle not shown. In this way water and liquid nourishment can be recycled.

Figure 2:
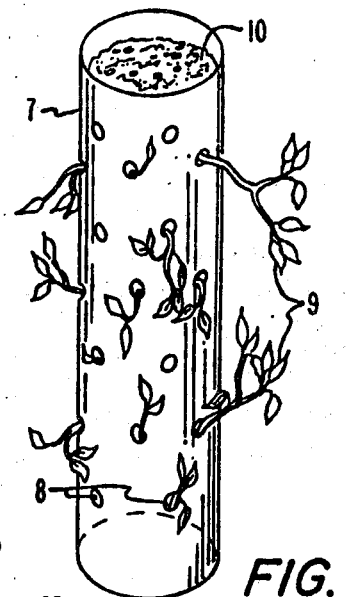

Referring then to FIG. 2, the cylinder 7 is the same as 1 of FIG. 1. Holes 8 are the same as 2 of FIG. 1. In this FIG. 2 small shoots and branches 9 are shown growing from 8. These shoots and branches 9 receive light in a normal way and produce normal plant growth from the seeds planted in 8 and embedded in composition 10 which is the same type of composition as 4 of FIG. 1. Water and liquid nourishment is received into 7 according to the description of FIG. 1 for receiving the same into cylinder 1 in that figure. In this FIG. 2 a condition of the invention for a particular period in time is represented. During the period represented by FIG. 2 there is no shield around branches 9 such as the shield 20 around branches 19 in FIG. 3. During this period of FIG. 2 branches 9 grow to a significant length and produce leaves and foliage which use photosynthesis in the normal way. At the end of the period described by FIG. 2 the ends of the branches farthest removed from cylinder 7 are inserted through holes in a shield, not shown in this FIG. 2 but shown in FIG. 3 as shield 20. Then in the time period represented by FIG. 3 light will be impeded from reaching all of the branch segments closest to cylinder 7 and only the segments farther from 7 will receive light. The inner segments and close to 7, namely those which are in the dark, at that time will receive a spray of liquid nutrient. Full segments are not shown in this FIG. 2 but in FIG. 3.

Figure 3:
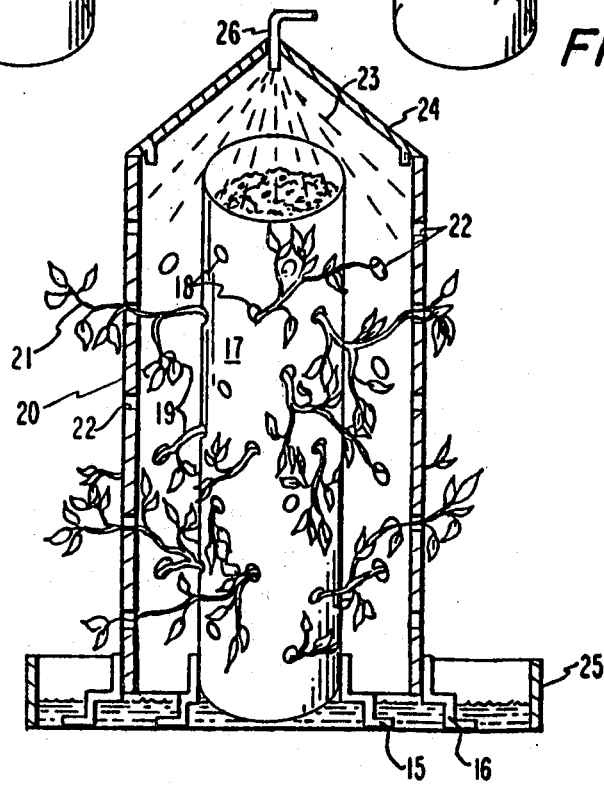

Referring directly to FIG. 3 then, the cylinder 17 is the same as 7 of FIG. 2. The holes 18 are the same as 8 of FIG. 2. Branch segments 19 are later developments of the branches 9 shown in FIG. 2. The light shield 20 is of opaque material and in the principal embodiment it is in the form of a cylinder which surrounds cylinder 17 and prevents light from reaching branch segments 19. Exterior branch segments 21 are extensions of 19 which project through outer cylinder holes 22 into an area in which they receive light. The interior segments 19 receive a spray of nutrient aerosol 23 and are thereby converted into an additional root system. The roots resulting from the conversion are shown in the following FIG. 4 but in this FIG. 3 only branch segments 19 which are to be converted to roots are shown. Conical light shield 24 prevents overhead light from reaching the segments 19 which are being layered into roots. The liquid nutrient receptacle 25 receives surplus nutrient 14. Support brackets 15 and 16 hold cylinder 17 and light shield 20. Spray nozzle 26 ejects aerosol 23 over 19. Air circulation is provided through openings 27 and 28. It is understood that a pump not shown may be used to recycle the nutrient collected in 25 back to 26. Similarly, according to conventional practice a liquid nutrient reservoir may be placed in the supply line between 25 and 26. A filter may also be placed in that line, but neither the line nor the reservoir nor the filter are shown as their functions are well understood in the current art. It is not intended to limit the inventive concept to a particular type of spray nozzle nor to a particular kind of nutrient watering process. Aerosol nozzles using high pressure nutrient liquid are to be used for nozzle 26 in one embodiment. In another embodiment an air jet which entrains liquid and atomizes it is to be used for 26. In still another embodiment a perforated container positioned over 19 and filled with liquid nutrient is used to provide a rain-like application of nutrient on 19. In this embodiment pieces of plastic foam, glass wool or other fibrous material may be intersperced between the branch segments 19. This capillary material is not shown but its function is to contact a large surface area of the branch segments 19 and to distribute liquid nourishment over that area by soaking up the rain-like drops that fall from the perforated container and by transferring this liquid nourishment by means of capillary action to a large area of the shielded branches. During the period when the branches 19 are being converted to roots, the danger of infection by unwanted microorganisms is reduced in one embodiment by the removal of the leaves from those branches which are being converted to roots. While the opaque light shield 20 is described to be in the form of a cylinder, it is not intended that it be limited to only this one shape but many shapes may be used as for instance the shape of a rectangular box open on the top and bottom and having branch support holes in the sides. Also the shape of a cylinder divided into halves along its length provides a convenient embodiment in that the halves are easily placed together to form a cylindrical shape around the branches to be converted to roots once these branches have grown to sufficient length. For similar reasons it is not intended to limit the invention to a shield of a particular diameter or height. For instance the difference between the diameters of the inside cylinder and the outer shield is greater for larger types of plants than for smaller ones. For example a large tomatoe plant requires a separation distance between the inner cylinder and the outer shield of approximately ten inches while leaf lettuce requires only a few inches of separation. Only the cylindrical shape is shown for light shield 20 in this FIG. 3. A cylinder formed from two hinged cylinder halves is able to be used for 20 and is described in FIG. 5.

Figure 4:
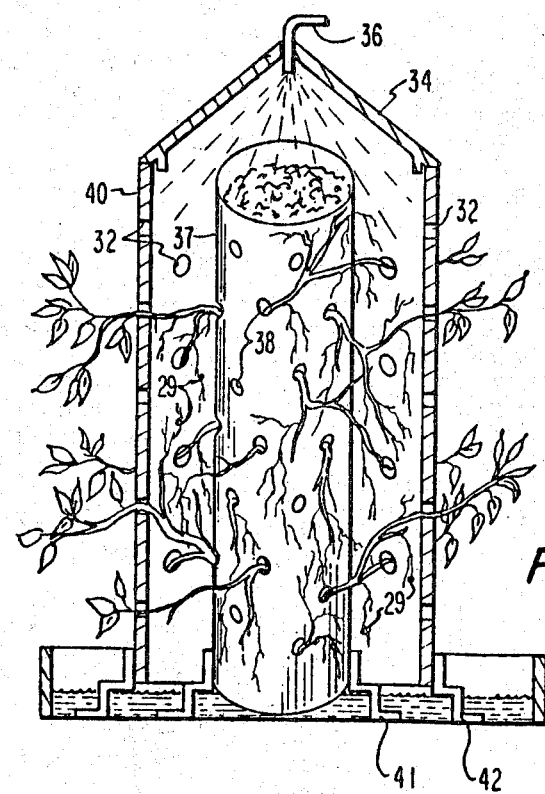
FIG. 4 shows two concentric cylinders and a root system supported by holes in both the inner and outer cylinders and suspended in air between the cylinders.

Now in FIG. 4 all of the elements are the same as the elements of FIG. 3 with the exception that the branch segments 19 of FIG. 3 are shown in their converted form which in this FIG. 4 is air suspended root system 29. The light shield 40 is the same as 20 of FIG. 3. Shield holes 32 are the same as holes 22 of FIG. 3. Again in FIG. 4 the inner cylinder 37 is the same as 17 of FIG. 3. Holes 18 of FIG. 3 correspond to 38 of FIG. 4. Exterior branch segments 31 are the same as segments 21 of FIG. 3. Conical light shield 34 is the same as 24 of FIG. 3. Receptacle 35 and nozzle 36 are the same as 25 and 26 respectively of FIG. 3. All of the elements of this FIG. 4 function as their counterparts in FIG. 3 but this FIG. 4 shows a later period in time. This period is after segments 19 have been converted to roots and are functioning as roots to increase the growth rate of the plant. Support brackets 41 and 42 in this FIG. 4 are the same as brackets 15 and 16 of FIG. 3.

Figure 5:
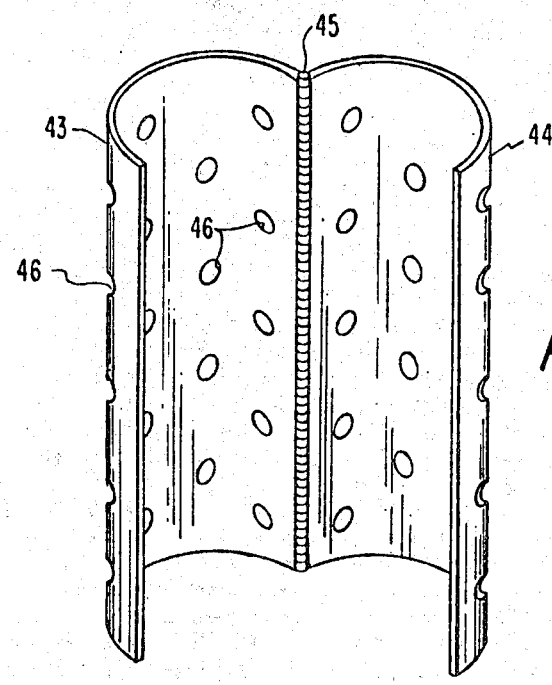
FIG. 5 shows a light shield in the form of two halves of a cylinder which are hinged together along their lengths.

Referring now to FIG. 5 cylinder halves 43 and 44 pivot on hinge 45. In their closed position 43 and 44 form one cylinder and become a light shield such as 20 of FIG. 3 or 40 of FIG. 4. The branch support holes 46 are the same as 22 of FIG. 3 and 32 of FIG. 4. As the halves 43 and 44 are being closed around the early formed branches to form a light shield like 20 as described in FIG. 3, the ends of the branches, such as segments 21 of FIG. 3, are drawn through holes 46 for a short distance. In this way when halves 43 and 44 are completely closed, the cylinder shield which is formed will allow light to contact only those segments of the branches which extend outward from the cylinder wall. In other embodiments a long rectangular box may be used in the same way as the hinged cylinder of this FIG. 5. A door on one side of the box then pivots on a hinge and opens to receive branches through its support holes and through support holes in the sides of the box which is open on the top and on the bottom. The box with its door, hinge and holes is not shown.

I claim:

1. A system for suspending plant roots in air and for augmenting root mass of plants grown hydroponically in a vertical array comprising:
   (1) a seed sprouting and early root support means in the form of a vertical column of particulate support material enclosed by a cylindrical wall, said wall having a plurality of holes, said support means being capable of firmly supporting plant seeds, early roots and branches by means of said support material and by said holes in the wall, said column containing also plant nutrient and water which it is able to receive through an opening at the top of the wall.
   (2) a branch segment to root mass conversion means in the form of a light shield and a hydroponic solution applicator, said light shield surrounding said cylindrical wall and being shielding segments of said branch extending from said wall from light contact and supporting branches by means of holes extending through said shielding, and said solution applicator being capable of applying liquid nourishment to the branch segments through an opening in said shield,
   (3) continueing nourishment to suspended roots application means capable of supplying both nutrient solution and air to the suspended root system.

2. A plant root suspension and augmentation system as in claim 1 in which the hydroponic solution application means is a spray ejecting hydroponic solution onto branch segments shielded from light and suspended in air and in which the continueing nourishment to roots application means is the same nutrient solution spray.

3. A plant root suspension and root augmentation system as in claim 1 in which the light shield of the branch segment to root mass conversion means is a cylinder enclosing segments of branches adjacent to roots while allowing outer segments of the same branches to extend horizontally outward and through holes in the cylinder, said cylinder being positioned with its length extending in a vertical plane and coaxially enclosing the vertical column of the early root support means.

4. A plant root suspension and root augmentation system as in claim 1 in which the nutrient solution applicator of the branch segment to root mass conversion means is a perforated container holding nutrient solution and being suspended above the branch segments converting to roots, thereby said container being capable of dispersing rain-like drops to capillary material in contact with these branches and by said capillary material conveying the nutrient solution to these branches.

5. A plant root suspension and root augmentation system as in claim 1 in which the cylindrical wall enclosing the root support material of the early root support means is in the form of porous ceramic material capable of containing root support material and liquid nourishment while being permeable to air.

6. A method for suspending plant roots in air and augmenting plant root mass for plants grown hydroponically in a vertical array comprising:
   (1) growing plants vertically in an array one above the other in a column of root support material in such a way that the branches of the plants extend horizontally outward from the column through perforations in a wall surrounding and holding said root support material and
   (2) providing light and air to the branches growing horizontally from the vertical column for a period of significant branch development and
   (3) shielding branch segments adjacent to the column from light while providing light to those segments of the same branches which segments are remote from the column and applying nutrient solution to those branch segments shielded from light thereby converting the shielded branch segments to the principal root system of the plants and producing an air-suspended root system for the plants and
   (4) continueing to apply the nutrient solution to the newly formed roots.

7. A method as in claim 6 in which applying nutrient solution to branch segments thereby converting them to the suspended root system is by spraying branch segments adjacent to the early roots with a nutrient aerosol spray of hydroponic solution.

* * * * *